United States Patent [19]

Guarneri et al.

[11] Patent Number: 5,238,969
[45] Date of Patent: Aug. 24, 1993

[54] PROCESS FOR THE PREPARATION OF CHARGED THERMOSETTING COMPOUNDS OF THE POLYURETHANE TYPE AND COMPOUNDS OBTAINED THEREBY

[76] Inventors: Marie-Josée Guarneri, Les Berges du Thion Bat A 17 Av du Thion, Annecy, France, F-74000; Christian Leriche, 17 résidence du Vieux Puits, Feucherolles, France, F-78810; Jean Preneau, 106 Av. Maréchal Joffre, Fontenay-sous-Bois, France, F-94120; Patrick Trouve, 36, rue de la Noise; Pierre Verrier, 45-47 rue Bonnelais, both of Clamart, France, F-92140

[21] Appl. No.: 835,926

[22] PCT Filed: Aug. 30, 1990

[86] PCT No.: PCT/FR90/00637
 § 371 Date: Mar. 31, 1992
 § 102(e) Date: Mar. 31, 1992

[87] PCT Pub. No.: WO91/03513
 PCT Pub. Date: Mar. 21, 1991

[30] Foreign Application Priority Data

Aug. 31, 1989 [FR] France ............................... 89 11618

[51] Int. Cl.⁵ .............................................. C08G 18/14
[52] U.S. Cl. ...................................... 521/99; 521/107; 521/109.1; 521/121; 521/122; 521/123; 521/130; 524/700; 524/710; 524/733; 524/734; 524/775; 524/783; 524/785; 524/786; 524/788
[58] Field of Search ..................... 521/99, 107, 109.1, 521/121, 122, 123, 130; 524/700, 710, 733, 734, 775, 783, 785, 786, 788

[56] References Cited

FOREIGN PATENT DOCUMENTS

| | | |
|---|---|---|
| 0013142 | 7/1980 | European Pat. Off. . |
| 0153193 | 8/1985 | European Pat. Off. . |
| 2372851 | 6/1978 | France . |
| 2029421 | 3/1980 | United Kingdom . |

OTHER PUBLICATIONS

Database Chemical Abstracts, vol. 108, No. 12, 1987, resume no. 187763q, (Columbus, Ohio, US), T. I. Chalykh et al.: "Sorption and diffusion of water vapor in filled polyurethanes and poly (vinyl chloride)", & Izv, Vyssh. Uchebn, Zaved., Khim., Khim. Trekhnol., 30 (12), 100–4.

Database Chemical Abstracts, (HOTE:STN), vol. 78, No. 12, 1972, resume no. 73184h; (Columbus, Ohio, US), &ES, A, 371150 (J. SHIH) 1 Apr. 1972.

*Primary Examiner*—Maurice J. Welsh
*Attorney, Agent, or Firm*—Oblon, Spivak, McClelland, Maier & Neustadt

[57] ABSTRACT

Process for the preparation of filled heat-curable compounds of the polyurethane type by reaction of condensation of the constituents of the desired compound in the presence of a pulverulent filler, which is characterized in that the said filler is predispersed in the presence of a stabilizing agent in a liquid organic phase compatible with the desired heat-curable compound in the course of its formation reaction, the said filler being then in the form of a homogeneous and stable suspension, and the suspension thus prepared is then introduced into the reaction mixture before, during or after the introduction of at least one of the constituents of the desired heat-curable compound.

The process according to the invention makes it possible to produce compounds of the polyurethane type whose mechanical and physical characteristics are at least equivalent or even improved in relation to those of the unfilled identical compounds by virtue of the excellent distribution of the inorganic filler.

31 Claims, No Drawings

PROCESS FOR THE PREPARATION OF CHARGED THERMOSETTING COMPOUNDS OF THE POLYURETHANE TYPE AND COMPOUNDS OBTAINED THEREBY

FIELD OF THE INVENTION

The invention relates to a process for preparation of filled heat-curable compounds of the polyurethane type by condensation reaction of their constituents in the presence of a pulverulent filler.

The invention also relates to the filled heat-curable compounds of the polyurethane type obtained according to the process.

The invention finally relates more particularly to the filled foamed heat-curable compounds of the polyurethane type obtained according to the process.

BACKGROUND OF THE INVENTION

For a long time specialist literature has described many heat-curable compounds filled with pulverulent inorganic materials of preferably pigment-like size and the processes for obtaining them, which concern both foamed and unfoamed filled heat-curable compounds, which in the first case are in the form of plastic masses containing fine gaseous inclusions.

The introduction of inorganic fillers (French patent 2,531,971) into the various heat-curable compounds of the polyurethane type is directed at various objectives in order to respond to demands of specialist or user industries, such as, for example, the motor vehicle, building, electronics, electrical domestic appliances or other, industries, for availability of nonmetallic products with specific characteristics such as lightness, rigidity, reduced shrinkage, decrease in the expansion coefficient, improvement in thermal shock resistance, improvement in sound insulation, sufficient flexural, tensile, compressive mechanical strength or other major physical characteristics.

Various fillers intended for heat-curable compounds of the polyurethane type are referred to in "European Plastics News" (1979, August, page 21) and "Modern Plastic International" (1982, April, page 42), such as calcium carbonate, talc, mica, aluminium trihydrate, silica, but also glass fibres, textile fibres or others. Thus, in the RIM (Reaction Injection Moulding) and RRIM (Reinforced Reaction Injection Moulding) processes fillers as diverse as glass fibres, ballotini, mica, wollastonite, talc and treated inorganic fibres are often used in order to increase the rigidity of the articles produced and to reduce their cost ("Plastic Technologic" 1978, November, page 13 and "Elastomerics", 1979, February, page 25).

Various processes are proposed for performing the introduction of fillers into heat-curable compounds, the essential preoccupation of which is to produce filled heat-curable compounds which have at least some of the specific characteristics referred to above.

In a first type of process the filler is introduced into one of the constituents of the polyurethane compound, generally the polyol. To stabilize the suspension thus prepared, that is to say to avoid sedimentation effects, the polyol is frequently subjected to grafting (DE OS 2,654,746, 2,714,291 and 2,739,620), with methacrylic acid or with another vinyl compound such as styrene, or else with isocyanate (DE OS 2,834,623). However, experimental results show that the suspension thus prepared does not escape either a considerable increase in its viscosity, which makes it difficult to handle, or a poor distribution of the filler within the heat-curable compound produced.

According to a second type of process, and to try and get rid of the disadvantages revealed in the first type, the filler is surface-treated before its introduction into one of the constituents of the desired heat-curable compound (the polyol), by means of a coating agent which is compatible with the constituents, a coating agent which is, for example, a $C_8$ to $C_{14}$ alcohol (FR 2,531,971). However, this type of process produces disadvantages which are substantially identical with those referred to earlier, since the user still finds an increase in the viscosity of the suspension of the filler in the polyol, attenuated to be sure, but still too high, which causes nonuniform dispersion of this filler in the heat-curable compound which is subsequently formed.

In another type of process, which is directed towards the production of unfoamed filled heat-curable compounds (intended to be compression-moulded), the process consists in preparing (for example according to FR 1,512,029) a mixture consisting of the filler and of the necessary additives such as lubricants, condensation catalysts, optionally colouring substances and plasticizers and in then introducing into this mixture, which is being stirred vigorously, the heat-curable resin or its initial constituents, in well-defined quantities and proportions.

However, the heat-curable compounds thus produced exhibit the same disadvantages as those already referred to, which result from a nonuniform dispersion of the filler within the said compounds.

According to another type of process which is directed more towards the production of filled foamed heat-curable compounds, the filler and the plasticizer are introduced separately into the mixture of the constituents of the desired heat-curable compound. A process of this type (described for example in JP 56-155,232 or ES 371,150) results in foamed heat-curable compounds of the polyurethane type in which the cells are formed nonuniformly and are consequently embrittled by the poor filler dispersion.

Thus, it appears that a real and serious problem exists as soon as fillers, in particular inorganic ones, are introduced into polyurethane heat-curable compounds, since these filled compounds exhibit unacceptable physical anomalies.

In the case of unfoamed filled polyurethane compounds the physical anomalies revealed by differences from these same compounds unfilled are, for example, not only the increase in the density and in the rigidity, but also the weakening in mechanical characteristics such as reduced tensile, flexural and compressive strength.

In the case of filled and foamed polyurethane compounds, physical anomalies revealed in the first group also manifest themselves, with the additional appearance of phenomena such as the increase in the density of the filled compound, in its heterogeneous hardness to the touch, in nonuniformity of flexibility and in mechanical characteristics which are rapidly weakened by the application of repeated deformation cycles (hysteresis). All these phenomena are linked, as the Applicant Company has been able to ascertain, with a poor dispersion of the filler within the desired heat-curable compound.

Lastly, added to all these ills are phenomena of increase in the viscosity of the medium receiving the filler or of sedimentation of the said filler in industrial plants, phenomena which prejudice their good operation and the quality of the heat-curable compounds to be marketed.

Consequently, the problem of the utilization of the fillers in the heat-curable compounds of the polyurethane type remaining in its entirety, it is understandable that their use in these compounds is very limited.

Thus, where the polyurethanes are concerned, the objectives which the invention is aimed at are to prevent the increase in the viscosity of the constituent or of the mixture of the constituent of the desired heat-curable compound receiving the inorganic filler; to prevent the filler sedimentation phenomena in industrial plants suitable for the production of the desired heat-curable compound; to permit the introduction of the filler into one of the constituents or simultaneously with all the constituents or else in the mixture of the constituents of the desired heat-curable compound; finally, to produce an excellent distribution of the inorganic filler within the desired heat-curable compound, in order to provide it with an appreciable improvement in its physical and mechanical properties and processability, while increasing the quantity of filler which is introduced.

SUMMARY OF THE INVENTION

Aware of the abovementioned disadvantages, the Applicant Company has sought, through its research, to establish a process for the preparation of filled heat-curable compounds of the polyurethane type meeting the objectives which it set itself.

The process according to the invention for the preparation of filled heat-curable compounds of the polyurethane type by reaction of condensation of the constituents of the desired compound in the presence of a pulverulent filler is characterized in that the said filler is predispersed in the presence of a stabilizing agent in a liquid organic phase compatible with the desired heat-curable compound in the course of its formation reaction, the said filler being then in the form of a homogeneous and stable dispersion, and the suspension thus prepared is then introduced into the reaction mixture before, during or after the introduction of at least one of the constituents of the desired heat-curable compound.

DETAILED DESCRIPTION OF THE INVENTION

While the prior art recommends processes for the preparation of filled heat-curable compounds which comprise the introduction of the filler into the reaction mixture without previous preparation, or else after a surface treatment, processes which result in obtaining filled heat-curable compounds whose mechanical and physical characteristics are still diminished, the process according to the invention is distinguished therefrom by the fact that the filler introduced into the reaction mixture is introduced in the form of a homogeneous and stable suspension of the said filler in a liquid organic phase compatible with the desired heat-curable compound, that is to say compatible with at least one of the constituents of the desired heat-curable compound and during the reaction of formation of the said heat-curable compound.

According to the invention the liquid organic phase compatible with the desired heat-curable compound is chosen from plasticizers for the heat-curable compounds of the polyurethane type and desirably from the group consisting of symmetrical or unsymmetrical aliphatic, aromatic, cyclic, branched or unbranched dialkyl phthalates or glycol derivatives, used by themselves or mixed, such as, for example, dioctyl phthalate, dibutyl phthalate, dinonyl phthalate, didecyl phthalate, diheptyl phthalate, diisodecyl phthalate, diisoundecylenic phthalate, mixed octyl, butyl and decyl phthalates, benzyl phthalate, cyclohexyl phthalate, methoxyethyl phthalate, methoxybutyl phthalate, butoxyethyl phthalate and other glycol-based substituents, organic or inorganic poly- or monoacidic esters of the alkyl adipate or alkyl sebacate type, diesters of $C_1$ to $C_8$ alcohols of mono-, di- or triethylene glycol and of glycerol of the trimellitate, azelate, abietate, citrate, mellitate, stearate, oleate, palmitate, ricinoleate, myristate, benzoate, or pelargonate type, mono- or polyalkyl and aryl phosphates and glycol derivatives such as, for example, trioctyl phosphate, tricresyl phosphate, octyldicresyl phosphate, or others, alkylaryl phosphates, polyesters such as, for example, ethylene glycol or propylene glycol polyadipates, ethylene glycol or propylene glycol polysebacates and condensed halophosphates.

The pulverulent filler to be predispersed within the abovementioned liquid organic phase and taking part in the process according to the invention for the preparation of filled heat-curable compounds of the polyurethane type is made up of pulverulent substances of inorganic or synthetic origin.

The pulverulent inorganic substances forming part of the filler are chosen, for example, from inorganic salts and/or oxides such as calcium carbonate, magnesium carbonate, zinc carbonate, dolomite, lime or magnesia; aluminium trihydroxide; silica; clays and other silicoaluminous materials such as kaolin, talc or mica; metallic oxides, such as, for example, zinc oxide, antimony trioxide, iron oxides, titanium oxide, wollastonite, glass fibres and ballotini, various pigments and red phosphorus.

The filler can also be made up of organic pulverulent substances of natural or synthetic origin such as, for example, colorants, carbon black, starch, cellulose fibres and flour, carbon fibres and various agents known for their specific actions, such as, for example, melamine powders.

All these pulverulent substances can be used in the filler by themselves or in combination according to the desired heat-curable compound.

The pulverulent substances employed in the invention have a dimension of between 0.01 and 300 μm and more preferably between 0.1 and 100 μm.

The stabilizing agent used for the preparation of the homogeneous and stable suspension of the filler in the liquid organic phase compatible with the desired heat-curable compound corresponds to the general formula containing at least one free acidic functional group:

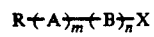

in which (A) denotes ethylene oxide, (B) denotes propylene oxide, with $0 \leq (m+n) \leq 24$, R is an alkyl radical, an aryl radical, an alkylaryl radical, a saturated or unsaturated heterocyclic ring containing from 5 to 28 carbon atoms and preferably from 8 to 24 carbon atoms, or alternatively a steroid radical, it being possible for the said radical R to be branched or unbranched and/or to contain one or more functional groups of the halogen —OH, —COOH, —COOR, —NO$_2$, —NH$_2$, —CONH$_2$, CN, phosphinic, phosphonic, phosphoric, sulphonic or sulphuric type, while X can be one of the carboxylic, phosphinic, phosphonic, phosphoric, sulphonic or sulphuric radicals.

In the case where X contains a number of acidic functional groups, at least one of these must remain free, it being possible for the others to be converted into salts or esterified by means of an alcohol of formula R'—OH in which the radical R' may be a carbon chain containing 1 to 4 carbon atoms or one of the radicals belonging to the group defined above in the case of R. It is also possible for the radical R' to be identical with the radical R.

By way of example, which may be mentioned radicals in the case of radical R are as diverse as normal or iso hexyl, octyl, decyl, dodecyl, dodecyldioxyethylene, tetradecyl, hexadecyl, hexadecyltrioxyethylene, octadecyl, octadecyloxyethylene, octylpentaoxyethylene, heptadecyl, phenyl, 2-methyl-2-butyl, 2-methyl-1-butyl, 3-phenyl-1-propenyl, 1-phenylpropenyl, para-nonylphenyl dioxyethylene, para-methylphenyl, cyclohexyl, the cholesterol radical, β-naphthyl and diol radicals.

Various adjuvants of known type and commonly employed in the production of heat-curable materials of the polyurethane type can also be introduced, either into the stable and homogeneous suspension of the filler or into the constituents of the desired heat-curable compound, or else simultaneously partly into the suspension of the filler and partly into the constituents of the desired heat-curable compound.

These various adjuvants are, for example, heat or photochemical stabilizers, lubricants, plasticizers other than those used in the preparation of the filler suspension, antistatics, flame-retardants, metal-passivating agents such as copper-passivating agents, blowing agents, reaction catalysts, surfactants, or still others.

It is also possible, as soon as the pulverulent filler is dispersed within the liquid organic phase compatible with the desired heat-curable compound according to the invention, to add thereto at least a fraction of at least one of the polyols capable of taking part in the production of the said heat-curable compound.

In practice, the preparation according to the invention of the stable and homogeneous suspension of the pulverulent filler in the liquid organic phase is carried out by using processes and means which are known to the specialist.

It can be carried out, for example, at room temperature in a mixer fitted with stirring means by the successive introduction of the liquid organic phase, of the stabilizing agent and of the filler.

According to the invention, the stable and homogeneous suspension of the pulverulent filler in the liquid organic phase is composed chiefly, in relation to the total mass:
a) of 20% to 80% by weight, and preferably from 40% to 70% by weight of the filler,
b) of 79.9% to 18.4% by weight and preferably from 59.5% to 28.9% by weight of the liquid organic phase,
c) of 0.1% to 1.6% by weight, and preferably of 0.5% to 1.1% by weight of the stabilizing agent.

The viscosity of the stable and homogeneous suspension of the pulverulent filler is desirably between 500 and 2,000 mPa.s and preferably between 600 and 1,800 mPa.s, in order to be compatible with that of the polyols employed in the composition of the desired heat-curable compound of the polyurethane type. This viscosity is measured at room temperature by means of a Brookfield apparatus fitted with a number 3 or 4 spindle according to the viscosity to be measured; it is measured at a speed of 100 revolutions per minute.

According to the invention, as soon as the homogeneous and stable suspension of the filler in the liquid organic phase is produced, the suspension is introduced in the initial composition of the desired heat-curable compound of the polyurethane type, comprising at least one polyol or an organic constituent containing a mobile hydrogen, at least one polyisocyanate, optionally a foaming agent, a catalyst and optionally other agents.

The stable and homogeneous suspension of the filler is introduced into the initial composition of the desired heat-curable compound of the polyurethane type in a proportion of 1% to 100% by weight and preferably of 10% to 50% by weight relative to the polyol used.

While it is known that the introduction of a filler (in a given quantity) into a polyol results in a very large increase in the viscosity of the filled polyol when compared with that of the polyol alone, the introduction of the same quantity of the said filler into the polyol in the form of the stable and homogeneous suspension according to the invention makes it possible to keep the viscosity of the polyol thus filled close to the initial viscosity of the said polyol alone, or even to reduce it.

The polyols used according to the invention are well-known constituents which belong to the groups of the polyethers and of polyesters.

Among the common polyol polyethers there may be mentioned, for example, the products of the addition of propylene oxide to a simple polyol such as, for example, glycol, glycerol, trimethylolpropane, sorbitol, in the presence or absence of ethylene oxide. However, special polyol polyethers may also be mentioned, such as, for example, aminated-base polyethers obtained by the addition of propylene oxide or optionally ethylene oxide to amines, halogenated polyethers and grafted polyethers resulting from the copolymerization of styrene and of acrylonitrile in suspension in a polyether, or else polytetramethylene glycol.

Among the polyol polyesters there may be mentioned, for example, those resulting from the polycondensation of polyalcohols with polyacids or their anhydrides, such as diacids, such as, for example, adipic, phthalic or other diacids, reacting with diols (for example ethylene glycol, propylene glycol, butylene glycol or others); triols (for example, glycerol, trimethylolpropane or others), and tetrols (for example, pentaerythritol or others, by themselves or mixed).

However, among the polyols there may also be mentioned various hydroxylated compounds such as, for example, hydroxylated polybutadienes, prepolymers containing hydroxyl end groups (resulting from the reaction of an excess of polyol with a diisocyanate), or else simple polyols such as, for example, glycerol, amino alcohols used in a small quantity with polyol polyethers or polyol polyesters to increase the cross-linking.

The polyisocyanates used according to the invention are also well-known compounds of aromatic type, such as, for example, toluene diisocyanate (TDI), 4,4'-diphenylmethane diisocyanate and its homologues (MDI), 1,5-naphthalene diisocyanate (NDI), or of linear type such as, for example, hexamethylene diisocyanate (HDI), isophorone diisocyanate (IPDI) or else those taking the form of prepolymers obtained by the combination of isocyanates with each other or with reactive compounds.

Foaming agents for the heat-curable compound of the polyurethane type can also be used. They are chosen from those which are well known such as, for example, water, which reacts with the —NCO radicals releasing carbon dioxide, or else fluorine-containing liquids and gases such as trichlorofluoromethane, dichlorofluoromethane or other fluoroalkanes, as well as various hydrocarbons, in particular halogenated ones such as, for example, dichloromethane.

For the reaction of formation of the desired heat-curable compound to be balanced it is desirable to introduce into the reaction mixture a suitable catalytic system made up of at least one catalytic component. Among the catalytic components used may be mentioned, for example, tertiary amines, triethylamine, N-methylmorpholine, substituted benzylamines, diaza[2.2.2]bicyclooctane, or else tin compounds such as, for example, dibutyl tin dilaurate, stannous octanoate, or else organic sodium, potassium or calcium salts, for example.

Finally, various other adjuvants of known type can also be introduced into the composition of the desired filled heat-curable compound. These various possible adjuvants belong to the groups of surface-active agents, (for example, siloxane-alkylene oxide block polymers, sulphonates, nonionic surfactants), flame-retardant agents involved in the structure of the macromolecular chains (for example by incorporation of nitrogen, phosphorus, chlorine or bromine atoms in the said structure), pigments and colorants and demoulding agents, cross-linking agents such as polyamines, ethylenediamine or others.

The filled heat-curable compound of the polyurethane type is obtained, generally, at room temperature, by mixing the homogeneous and stable suspension of the filler:
either by first of all forming a premix of the said suspension with the polyol, this premix being then mixed with the other constituents,
or simultaneously, with the various constituents of the desired heat-curable compound,
or, finally, after the premix of the constituents has been produced,
all the constituents used being introduced in quantities and proportions defined in the application.

It may be desirable to modify the relative proportions of the various constituents of the formulation in order to increase the density of the macromolecular network and thereby some mechanical properties (for example compressive strength). More particularly, it may be desirable to increase the "isocyanate value" (which is the percentage ratio of the isocyanate content used in the formulation to the theoretical content required) as is usually practised by the specialist.

The filled heat-curable compounds of the polyurethane type according to the process of the invention can be produced by known means, for example by injection, by casting or by spraying, the various components involved in the reaction being metered, for example, using metering (gear or plunger) pumps and mixed in a mixing head to form the composition employed using the above-mentioned means.

In this way, it is possible to produce filled heat-curable compounds of the unfoamed polyurethane, elastomeric polyurethane or else rigid, semirigid or flexible foamed polyurethane type without producing, at the time of the introduction of the filler, an increase in the viscosity of the reaction mixture made up of the various constituents and agents used, nor the appearance of filler sedimentation phenomena in industrial plants.

More than that, and by virtue of the invention, it is possible to perform the introduction of the filler into one of the constituents, or simultaneously with all the constituents, or else into the mixture of the constituents of the desired heat-curable compound, while obtaining an excellent distribution of the inorganic filler within it and an appreciable improvement in its mechanical and physical properties and in processability while increasing the quantity of filler which is introduced.

The process according to the invention can be applied using known techniques intended for the manufacture of heat-curable compounds of the polyurethane type, for example in free foaming, in moulding in a cold or hot, open or closed mould or in others still.

The invention will be understood better by virtue of the illustrative description of the examples of preparation of suspensions of the filler in the organic liquid phase and the dispersion of the filler within the heat-curable compounds of the polyurethane type.

EXAMPLE 1

This example illustrates the preparation of the homogeneous and stable suspension of the inorganic filler of pigment-like size in a liquid organic phase in the presence of a stabilizing agent.

To do this, the water-immiscible liquid organic phase, which is diisoundecylenic phthalate (D.I.U.P.) was introduced into a preparation vessel fitted with a stirrer (fast disperser of a known type) in a proportion of 39.1% by weight relative to the mass of the suspension to be prepared.

Next, the stabilizing agent, which is a phosphated oxyethylenated alkyl of formula $C_{10}H_{21}$—$(CH_2$—$CH_2$—$O)_5$—$PO_2H_2$ (representing 1.5% by weight relative to the inorganic filler) was dissolved in the liquid organic phase in a proportion of 0.9% by weight relative to the mass of the suspension to be prepared.

Finally, into the solution thus prepared was introduced the pulverulent inorganic filler of pigment-like size, consisting of natural pulverulent calcium carbonate with a specific surface of 5.5 $m^2/g^{-1}$, a mean diameter of 1 $\mu$m and a 6 $\mu$m cut, in a proportion of 60% by weight relative to the mass of the suspension to be prepared.

At the end of its preparation, the suspension had a viscosity of 850 mPa.s. After a storage period of 8 days it was possible to ascertain that the prepared suspension was homogeneous and stable, since the viscosity measured at the end of preparation was the same and as no sedimentation phenomenon was observable.

By comparison, the introduction of 60% by weight of the same pulverulent inorganic filler ($CaCO_3$ with a specific surface of 5.5 $m^2/g$, a mean diameter of 1 $\mu$m and a 6 $\mu$m cut) into 40% by weight of the same liquid organic phase (DIUP) in the absence of the stabilizing agent results in the formation of pasty mixture whose viscosity can no longer be measured using the Brookfield viscometer.

EXAMPLE 2

This example illustrates the preparation of the homogeneous and stable suspension of the inorganic filler according to the invention, consisting of aluminium trihydroxides (marketed by Martinswerke under the name OL 104), with a specific surface of 3 $m^2/g$ and a mean diameter of 2 μm in the liquid organic phase in the presence of the same stabilizing agent as in Example 1.

The preparation was carried out according to the same process as in Example 1 and according to the following proportions in % by weight:

| | |
|---|---|
| aluminium trihydroxide | 50% |
| diisoundecylenic phthalate (D.I.U.P) | 49.5% |
| stabilizing agent: $C_{10}H_{21}(CH_2—CH_2—O)_5—PO_3H_2$ | 0.5% |

The viscosity of this suspension, measured at the end of its preparation, was 1,240 mPa.s (measured in a Brookfield viscometer-RTV No. 4 spindle, at 100 revolutions per minute at 23° C.).

No sedimentation phenomenon was observable after 8 days' storage.

EXAMPLE 3

This example illustrates the preparation of the homogenous and stable suspension of an organic filler according to the invention, consisting of a pulverulent melamine (marketed by the Chemie Linz Company) in a liquid organic phase in the presence of the same stabilizing agent as in Example 1.

The preparation was carried out according to the same process as in Example 1 and according to the following proportions in % by weight:

| | |
|---|---|
| Melamine | 70% |
| Phosphated plasticizer marketed by Monsanto under the name Santiciser 148 | 28.9% |
| Stabilizing agent $C_{10}H_{21}(CH_2—CH_2—O)_5—PO_3H_2$ | 1.1% |

The viscosity of this suspension, measured under the same conditions as in Example 2, was 6000 mPA.s. No sedimentation phenomenon was observable after eight days' storage.

EXAMPLE 4

This example illustrates the observed effect of the minor modification of the viscometric characteristics of a polyol filled by means of the stable and homogeneous suspension according to the invention by comparison with the viscometric characteristics of the same polyol by itself and filled by the direct introduction of the same filler in pulverulent form, as indicated by the prior art.

The following were prepared in a manner similar to the preparation process described in Example 1:

In the case of a first series of tests (Test 1), a homogeneous and stable suspension of a pulverulent calcium carbonate marketed under the trademark Millicarb by the Omya company by dispersing 50% by weight of the said filler in 49.5% by weight of dioctyl phthalate (liquid organic phase) with the aid of 0.5% by weight of a stabilizing agent of formula:

$C_8H_{17}(CH_2—CH_2—O)_5—PO_3H_2$.

In the case of a second series of tests (Test 2), a homogeneous and stable suspension of a calcium carbonate marketed under the trademark "L'Etiquette violette" by the Omya company, by dispersing 49.5% by weight of the said filler in 50% by weight of diisoundecylenic phthalate (liquid organic phase) with the aid of 0.5% by weight of a stabilizing agent of formula $C_{10}H_{21}(CH_2—CH_2—O)_5—PO_3H_2$ The following were then prepared for the two series of tests:
- the polyol filled with 25 parts of the pulverulent filler according to the prior art in 100 parts of the said polyol,
- the polyol filled with 50 parts of the homogeneous and stable suspension according to the invention in 100 parts of the said polyol.

The Brookfield viscosities at 23° C. (RVT 2 spindle) were accordingly measured, in mPa.s at 50 revolutions per minute:
- of the polyol by itself,
- of the homogeneous and stable suspensions of the fillers according to the invention
- of the polyol filled with the pulverulent inorganic fillers (according to the prior art)
- of the polyol filled with the homogeneous and stable suspensions according to the invention.

The sedimentation and nonsedimentation characteristics of each of the abovementioned filled polyols were also checked.

The corresponding results have been assembled in Table 1 below:

TABLE 1

| | Introduction of 25 parts of filler into 100 parts of polyol. Viscosity in mPa.s. | |
|---|---|---|
| | Test 1 | Test 2 |
| Polyol alone polyurax polyol U - PPG 2025 from BP | 430 | 430 |
| Homogeneous and stable suspension of the filler according to the invention | 300 | 660 |
| Polyol with pulverulent filler according to the prior art | Millicarb 650 complete sedimentation after 1 hour | Etiquette violette 1100 complete sedimentation after 1 hour thirty |
| Polyol with filler according to the invention | 400 No sedimentation after 2 days | 580 |

EXAMPLE 5

This example illustrates the process according to the invention for the preparation of filled heat-curable compounds of the polyurethane type by condensation reaction of the constituents of the desired compound in the presence of a pulverulent filler introduced in the form of the homogeneous and stable suspension of Example 1.

To do this, the continuous manufacture of filled polyurethane foam blocks for cutting out was carried out in an industrial plant by casting on a conveyor belt.

A casting head driven in a transverse reciprocating motion deposited the liquid composition (mixture of the constituents and the filler) on to a kraft paper with raised edges, supported by a first inclined conveyor belt. After the foaming was initiated, the foaming polyurethane composition was picked up by a second horizontal conveyor belt, the roof foaming (in the height direction) being controlled by virtue of the presence of a kraft paper maintained by a series of rolls.

The constituents forming part of the composition for producing the foaming polyurethane compound were introduced into the casting head using metering pumps, the mixing being performed by mechanical stirring.

The compositions used in the manufacture of the foamed polyurethane compound contained qualitatively the following constituents:

a polyether polyol with a molecular weight of 3,500 having available a hydroxyl number equal to 48 (expressed in milligrams of KOH per gram), a plasticizer and the filler being in the form of the suspension originating from Example 1, a polyisocyanate, which is toluene diisocyanate (TDI 80-20 containing 80% of 2,4-isomer and 20% of 2,6-isomer), water as foaming agent, well-known reaction catalysts such as diaza[2.2.2]-bicyclooctane (DABCO), dimethylethylamine (DMEA), or else stannous octanoate, silicones well-known as surface-active agents, colorants and various agents usually employed by the specialist.

The quantities of the various constituents, expressed in parts by weight, are given together in:

Table 2, when the compositions were employed on a machine adjusted to 200 centimeters in width (Tests 3 to 6), Table 3, when the compositions were employed on the same machine adjusted to 100 centimeters in width (Tests 7 to 10).

Similarly, all the mechanical and physical characteristics of the polyurethane foams thus produced have been brought together in Tables 4 and 5.

These characteristics were determined by means of the standardized methods which are listed below:

density, according to NF standard T56107 indentation hardness, according to ISO standard 2439 method B compression remanence according to ISO standard 1856 method A dynamic fatigue tests: height and hardness according to NF standards T56114 and T56115 compressive strength, according to DIN standard 53 577 wet aging, according to NF standard T56117 tensile strength, according to ISO standard 1798 elongation at break, according to ISO standard 1798 resistance to air flow, according to NF standard T56127.

Inspection of Tables 4 and 5 shows that all the physical and mechanical characteristics of the filled foamed polyurethanes produced according to the process of the invention are very close, or even equivalent to those of the same unfilled foamed polyurethanes. It is consequently apparent that the excellent dispersion of the filler within the polyurethane foams makes it possible to produce heat-curable compounds without deterioration in their mechanical and physical characteristics, this being by virtue of the process of the invention.

TABLE 2

POLYURETHANE COMPOSITIONS FOR 200 CENTIMETRE MACHINE

|  | TEST 3 in parts by weight | TEST 4 in parts by weight | TEST 5 in parts by weight | TEST 6 in parts by weight |
| --- | --- | --- | --- | --- |
| Polyol | 100.00 | 100.00 | 100.00 | 100.00 |
| Filler suspension | 0 | 15.00 | 20.00 | 25.00 |
| Toluene diisocyanate | 42.20 | 46.40 | 47.50 | 48.60 |
| Water | 3.20 | 3.60 | 3.70 | 3.80 |
| Catalyst 1 (DABCO) | 0.15 | 0.15 | 0.15 | 0.15 |
| Catalyst 2 (DMEA) | 0.30 | 0.30 | 0.30 | 0.30 |
| Catalyst 3 (stannous octanoate) | 0.19 | 0.31 | 0.32 | 0.34 |
| Silicones | 0.85 | 0.94 | 0.97 | 1.00 |

TABLE 3

POLYURETHANE COMPOSITIONS FOR 100 CENTIMETRE MACHINE

|  | TEST 7 in parts by weight | TEST 8 in parts by weight | TEST 9 in parts by weight | TEST 10 in parts by weight |
| --- | --- | --- | --- | --- |
| Polyol | 100.00 | 100.00 | 100.00 | 100.00 |
| Filler suspension | 0 | 15.00 | 20.00 | 25.00 |
| Toluene diisocyanate | 43.80 | 43.80 | 43.80 | 43.80 |
| Water | 3.35 | 3.35 | 3.35 | 3.35 |
| Catalyst 1 (DABCO) | 0.15 | 0.15 | 0.15 | 0.15 |
| Catalyst 2 (DMEA) | 0.30 | 0.30 | 0.30 | 0.30 |
| Catalyst 3 (stannous octanoate) | 0.21 | 0.28 | 0.31 | 0.34 |
| Silicones | 0.85 | 0.85 | 0.85 | 0.85 |

TABLE 4

MECHANICAL AND PHYSICAL CHARACTERISTICS OF THE POLYURETHANES ACCORDING TO TABLE I

|  | TEST 3 Control | TEST 4 | TEST 5 | TEST 6 |
| --- | --- | --- | --- | --- |
| Density in kg/m$^3$ | 29.0 | 29.5 | 30.4 | 30.3 |
| Indentation hardness (N) |  |  |  |  |
| 25% | 152 | 148 | 145 | 143 |
| 40% | 183 | 180 | 177 | 174 |
| 65% | 330 | 327 | 329 | 331 |
| Compression remanence in % |  |  |  |  |
| *height difference | −1.2 | −1.7 | −1.7 | −1.8 |
| *hardness difference | −18.7 | −19.7 | −20.2 | −20.5 |
| Dynamic fatigue tests 80,000×) |  |  |  |  |
| *Δ height in % | −1.0 | −1.5 | −1.5 | −1.5 |
| *Δ hardness in % | −26.3 | −27.7 | −27.2 | −26.7 |
| Compressive strength in kPa | 4.33 | 4.21 | 4.21 | 4.21 |
| Wet aging in % | −23.2 | −13.5 | −13.6 | −13.6 |
| Tensile strength in kPa | 91. | 107 | 104 | 98 |
| Elongation at break in % | 140 | 164 | 155 | 148 |
| Resistance to air flow in mm of water | 0.6 | 0.7 | 0.8 | 1.0 |
| S.O. quantity | 0.187 | 0.312 | 0.326 | 0.344 |

TABLE 5

MECHANICAL AND PHYSICAL CHARACTERISTICS OF THE POLYURETHANES ACCORDING TO TABLE 2

|  | TEST 7 Control | TEST 8 | TEST 9 | TEST 10 |
|---|---|---|---|---|
| Density in kg/m$^3$ | 25.0 | 27.4 | 28.8 | 30.4 |
| Indentation hardness (N) | | | | |
| 25% | 113 | 119 | 121 | 125 |
| 40% | 137 | 144 | 149 | 153 |
| 65% | 263 | 280 | 291 | 303 |
| Compression remanence in % | | | | |
| *height difference | −2.4 | −1.9 | −1.9 | −1.8 |
| *hardness difference Dynamic fatigue tests 80,000×) | | | | |
| *Δ height in % | −2.0 | −1.5 | −1.5 | −1.5 |
| *Δ hardness in % | −29.6 | −30.6 | −30.1 | −29.2 |
| Compressive strength in kPa | 3.45 | 3.61 | 3.72 | 3.88 |
| Wet aging in % | −7.9 | −10.1 | −9.7 | −9.3 |
| Tensile strength in kPa | 138 | 118 | 117 | 115 |
| Elongation at break in % | 252 | 208 | 208 | 205 |
| Resistance to air flow in mm of water | 1.1 | 0.95 | 0.97 | 0.97 |
| S.O. quantity | 0.200 | 0.275 | 0.288 | 0.300 |

EXAMPLE 6

This example is an illustration of comparison between the mechanical and physical characteristics of foamed polyurethanes:

Test 11 (control) without filler

Test 12, filled by means of the homogeneous and stable suspension of the filler in the liquid organic phase according to the invention.

Test 13, filled by direct introduction of the pulverulent filler and of the liquid organic phase.

These tests were carried out on a Secmer pilot machine permitting the noncontinuous manufacture of blocks 0.8×0.8×1.0 meter in size and evaluation of the mechanical characteristics which could be obtained in a process on an industrial scale.

The homogeneous and stable suspension according to the invention was made up of 60% by weight of pulverulent CaCO$_3$ (manufactured by the Omya company under the name Omyalite 60), dispersed in 39% by weight of diisoundecylenic phthalate in the presence of 1% by weight of a stabilizing agent

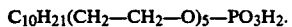

$C_{10}H_{21}(CH_2-CH_2-O)_5-PO_3H_2$.

The compositions used in the manufacture of the foamed polyurethanes contained qualitatively the following products:

diisocyanate: of Caradete 80 trademark from Shell
polyol: of Voranol CP 8322 trademark from Dow Chemicals
tin octanoate of Kosmos 29 trademark from Goldschmidt
DABCO 33 of Niax Catalyst A 33 trademark from Union Carbide
Niax Al from Union Carbide.
Dimethylethanolamine (DMEA) of Amietol M21 trademark from I.C.I.
Silicone: Thegostab BF 2370 from Goldschmidt The quantities of the various constituents, expressed in parts by weight, are brought together in Table 6.

Similarly, all the mechanical and physical characteristics of the polyurethane foams thus produced have been brought together in Table 7. These characteristics have been determined by means of the standardized methods which are listed in Example 5.

Analysis of these characteristics demonstrates that:
the indentation factor expressing the concept of comfort exhibits equivalent values in Tests 12 and 13, which are higher than the control test 11,
the tensile strength according to Test 13 is much lower than those of the control (Test 11) and of the invention (Test 12), which are identical, whereas the elongation at break according to the invention (Test 12) is higher than Test 13 and than Test 11 (control).
the compression remanence in % if the case of the invention appears better.
the density of the polyurethane foams of Test 12 and 13 is close to 40 kg/m$^3$ while the density of the control is lower. This higher density of Tests 12 and 13 can be brought back to the value of the control using known processes, such as a slight increase in the quantity of water subjected to the corresponding quantity of isocyanate.

TABLE 6

Composition of the polyurethanes

|  | Test 11 control | Test 12 according to the invention | Test 13 comparative |
|---|---|---|---|
| Voranol CP3322 polyol from Dow Chemicals | 100 | 100 | 100 |
| Suspension of the filler according to the invention | 0 | 15 | 0 |
| Equivalent pulverulent filler alone | 0 | 0 | 9 |
| Equivalent organic liquid phase alone | 0 | 0 | 6 |
| Toluene diisocyanate | 41.6 | 41.6 | 41.6 |
| Water | 3.2 | 3.2 | 3.2 |
| Catalyst 1 (DABCO) | 0.14 | 0.14 | 0.14 |
| Catalyst 2 (DMEA) | 0.08 | 0.08 | 0.08 |
| Catalyst 3 (NIAXA1) | 0.07 | 0.07 | 0.07 |
| Catalyst 4 (stannous octanoate) | 0.19 | 0.28 | 0.28 |
| Silicone | 0.90 | 0.90 | 0.90 |

TABLE 7

Mechanical and physical characteristics of the polyurethanes according to Table 6

|  | Test 11 control | Test 12 according to the invention | Test 13 comparative |
|---|---|---|---|
| Density kg/m$^3$ | 32.7 | 39.5 | 40.2 |
| Indentation hardness (N) | | | |
| 25% | 235 | 106 | 125 |
| 40% | 305 | 168 | 188 |
| 65% | 610 | 410 | 487 |
| Indentation factor | 2.59 | 3.86 | 3.89 |
| Compression remanence in % (height) | 8.6 | 6.3 | 7.3 |
| Compressive strength (kPa) | | | |
| 25% | 6.37 | 2.96 | 3.39 |
| 40% | 6.97 | 4.31 | 4.70 |
| 50% | 8.16 | 5.35 | 5.94 |
| 65% | 12.14 | 9.60 | 10.15 |
| Tensile strength (kPa) | 0.090 | 0.090 | 0.060 |
| Elongation at break (%). | 98 | 134 | 112 |

We claim:
1. Process for preparation of filled, polyurethane-type heat-curable compounds by means of the condensation reaction of the constituents of the desired compound in the presence of a pulverulent filler, wherein:

a) said filler is predispersed in the presence of a stabilizing agent introduced into a liquid organic phase compatible with the desired heat-curable compound during its polymerization reaction, and in which said stabilizing agent present in the liquid organic phase has the formula:

$$R-(A)_m-(B)_n-X$$

containing at least one free acid function, in which X is a carboxylic, phosphinic, phosphonic, phosphoric, sulfonic, or sulfuric radical, (A) is ethylene oxide, (B) is propylene oxide, with $0 \leq (m+n) \leq 24$, and where R is selected from the group consisting of alkyl radicals, aryls, alkylaryls, saturated or unsaturated heterocycles containing from 5 to 28 carbon atoms, and steroids;

b) the homogeneous and stable suspension of said filler prepared in this way is introduced into the reaction mixture before, during, or after addition of at least one of the constituents of the desired heat-curable compound.

2. Process according to claim 1, wherein the liquid organic phase is selected from the group consisting of dialkyl phthalates; symmetrical or asymmetrical, cyclic branched or unbranched, aliphatic, aromatic, and glycol derivative dialkyl phthalates; and mixtures thereof.

3. Process according to claim 1, wherein the liquid organic phase is selected from the group consisting of dioctylphthalate, dibutylphthalate, dinonylphthalate, didecylphthalate, diheptylphthalate, diisodecylphthalate, diisoundecylphthalate, mixed octyl, butyl and decyl phthalates, benzylphthalate, cyclohexylphthalate, methyloxyethylphthalate, methyloxybutylphthalate, butoxyethylphthalate, and other glycol-based substituents.

4. Process according to claim 1, wherein the liquid organic phase is selected from the group consisting of mono- or polyalkyl, aryl, glycol-derivative phosphates.

5. Process according to claim 1, wherein the liquid organic phase is selected from the group consisting of polyesters.

6. Process according to claim 1, wherein the R radical of the stabilizing agent is selected from the group consisting of alkyl, aryl, and alkylaryl radical and saturated or unsaturated heterocyclic ring which contains from 8 to 24 carbon atoms, and steroid radical.

7. Process according to claim 1, wherein, when the X radical of the stabilizing agent contains several acid functions, at least one of these functions is free, the others being converted into salts or esterified by an alcohol corresponding to formula R'—OH, in which R' is selected from the group consisting of a carbon chain containing from 1 to 4 carbon atoms and one of the radicals belonging to the group specified for R.

8. Process according to claim 1, wherein the R radical of the stabilizing agent contains at least one functional substituent selected from the group consisting of halogen, —OH, —COOH, —COOR, —NO₂, —NH₂, —CONH₂, phosphinic, phosphonic, phosphoric, sulfonic, and sulfuric type.

9. Process according to claim 8, wherein the R' radical is identical to the R radical.

10. Process according to claim 1, wherein an additive selected from the group consisting of the reaction catalysts, surfactants, thermal or photochemical stabilizers, lubricants, plasticizers, anti-static agents, fireproofing agents, metal passivating agents, and expanding agents is added to the reaction mixture.

11. Process according to claim 1, wherein the pulverulent filler to be predispersed in the liquid organic phase is selected from the group consisting of mineral and synthetic pulverulent substances.

12. Process according to claim 1, wherein the pulverulent filler to be predispersed in the liquid organic phase is selected from the group consisting of naturally-occurring and synthetic pulverulent organic substances.

13. Process according to claim 1, wherein the pulverulent filler is a combination of naturally-occurring mineral and synthetic pulverulent substances.

14. Process according to claim 1, wherein the pulverulent substances forming the filler have a dimension of between 0.01 and 300 μm.

15. Process according to claim 1, wherein the homogeneous and stable suspension of the filler is composed, in relation to total weight, of:
a) 20% to 80% by weight of the filler;
b) 79.9% to 18.4% by weight of the liquid organic phase; and
c) 0.1 to 1.6% by weight of the stabilizing agent.

16. Process according to claim 1, wherein a polyalcohol capable of being used to produce the desired heat-curable compound is added to the homogeneous and stable suspension of the filler.

17. Process according to claim 1, wherein the Brookfield viscosity of the homogeneous and stable suspension is between 500 and 2000 mPa.s measured at ambient temperature.

18. Process according to claim 1, wherein the homogeneous and stable suspension of the filler is introduced into the composition of the desired polyurethane compound in the proportion of from 1% to 100% by weight of the polyalcohol used.

19. Process according to claim 1, wherein the liquid organic phase is selected from the group consisting of trioctylphosphate, tricresylphosphate, octyldicresylphosphate, and other alkylaryl phosphates.

20. Process according to claim 1, wherein the liquid organic phase is selected from the group consisting of ethylene glycol, propylene glycol polyadipates and ethylene glycol or propylene glycol polysebacates.

21. Process according to claim 1, wherein the pulverulent filler to be predispersed in the liquid organic phase is selected from the group consisting of calcium carbonate, zinc carbonate, dolomite, chalk, magnesium oxide, aluminum trihydroxide, silica, clays, kaolin, talc, mica, zinc, iron, antimony, and titanium oxide, glass fibers and ballotini, wollastonite, organic or inorganic pigments, red phosphorus, and mixtures thereof.

22. Process according to claim 1, wherein the pulverulent filler to be predispersed in the liquid organic phase is selected from the group consisting of coloring agents, carbon black, starch, cellulose fibers or flour, carbon fibers, melamine powders, and mixtures thereof.

23. Process according to claim 1, wherein the pulverulent substances forming the filler have a dimension of between 0.1 and 100 μm.

24. Process according to claim 1, wherein the homogeneous and stable suspension of the filler is composed of:
a) from 40% to 70% by weight of the filler;
b) 50.5% to 28.9% by weight of the liquid organic phase; and
c) 0.5% to 1.1% by weight of the stabilizing agent.

25. Process according to claim 1, wherein the Brookfield viscosity of the homogeneous and stable suspension is between 600 and 1600 mPa.s measured at ambient temperature.

26. Process according to claim 15, wherein the homogeneous and stable suspension of the filler is first mixed with the polyalcohol in order to form a premix, this premix being then mixed with the other constituents and wherein all of the constituents are used in the quantities and proportions defined as required.

27. Process according to claim 1, wherein the stable and homogeneous suspension of the filler is added simultaneously to the various constituents of the desired polyurethane and wherein all of the constituents are used in the quantities and proportions defined as required.

28. Process according to claim 26, wherein the homogeneous and stable suspension is introduced into the reaction mixture after preparation of the premix of all of the constituents of the desired polyurethane and wherein all of the constituents are used in the quantities and proportions defined as required.

29. Process according to claim 1, wherein said process is applied using known techniques intended for the manufacture of heat-curable compounds of the polyurethane type.

30. Homogeneous and stable suspension of a pulverulent filler in a liquid organic phase to be used in the preparation of filled heat-curable compounds of the polyurethane type wherein said liquid organic phase is compatible with the desired heat-curable compound and wherein said filler is predispersed in the presence of a stabilizing agent which has the formula containing at least one free acidic functional group:

$$R-(A)_m-(B)_n-X$$

in which X is selected from the group consisting of carboxylic, phosphinic, phosphonic, phosphoric, sulfonic, and sulfuric radical, (A) is ethylene oxide, (B) is propylene oxide, with $0 \leq (m+n) \leq 24$, R is selected from the group consisting of alkyl radicals, aryl radicals, alkylaryls, saturated or unsaturated heterocyclic rings containing from 5 to 28 carbon atoms and steroid radical.

31. Process according to claim 1, wherein the liquid organic phase is selected from the group consisting of esters of organic or inorganic poly or monoacids; alkyladipate, alkysebacate; diesters of trimellitic, azelaic, abietic, citric, mellitic, stearic, oleic, palmitic, ricinoleic, myristic, benzoic and pelargonic acid; and C-1 to C-8 alcohols of mono, di, or triethylene glycol and glycerol.

* * * * *

UNITED STATES PATENT AND TRADEMARK OFFICE
CERTIFICATE OF CORRECTION

PATENT NO. : 5,238,969
DATED : AUGUST 24, 1993
INVENTOR(S) : MARIE-JOSEE GUARNERI ET AL

It is certified that error appears in the above-indentified patent and that said Letters Patent is hereby corrected as shown below:

Column 8, line 44, "specific surface of 5.5 $m^2/g^{-1}$" should read --specific surface of 5.5 $m^2/g$--.

Column 17, line 5, "claim 15" should read --claim 16--.

Signed and Sealed this

Twenty-fifth Day of April, 1995

Attest:

BRUCE LEHMAN

*Attesting Officer*    *Commissioner of Patents and Trademarks*